United States Patent Office

3,168,514
Patented Feb. 2, 1965

---

3,168,514
PROCESS FOR THE PREPARATION OF AZIRIDINE PHOSPHORYLDIFLUORIDES
William C. Preusse, Naperville, Ill., assignor to Olin Mathieson Chemical Corporation, New Haven, Conn., a corporation of Virginia
No Drawing. Filed Aug. 26, 1963, Ser. No. 304,615
3 Claims. (Cl. 260—239)

A number of ethylenimines are suitable for use in the practice of this invention. For example, 2,2-dimethyl-ethylenimine, 2-phenyl-ethylenimine, 2,3-dimethyl-ethylenimine, 2,2,3-triethyl-ethylenimine, and 2,2-diethyl-3-n-propyl-ethylenimine can be used to prepare 1-aziridinyl phosphoryldifluorides having the Formula I. However, the preferred ethylenimines for use in the process described herein are ethylenimine and 2-methyl-ethylenimine.

The reaction of pyrophosphoryltetrafluoride with the aforementioned ethylenimines can be carried out if so desired by the slow dropwise addition of the ethylenimine to the $P_2O_3F_4$. Under these circumstances, a reaction temperature of up to about 70° C. can be utilized. However, the reaction is vigorously exothermic, and a preferred process embodiment utilizes an inert organic diluent or solvent since the temperature of the reaction mixture may then be more conveniently adjusted and controlled. The use of a diluent or solvent is also preferred since in the preparation of a mole of 1-aziridinyl phosphoryldifluoride, there is always formed a mole of 1-aziridinium difluorophosphate, and this salt can be more readily removed from the reaction mixture by a conventional technique such as filtration when a diluent has been utilized in the reaction mixture. Suitable diluents for use in the process of this invention include ether, chloroform and the like. It is preferred to utilize a process temperature range of about 10° C. or less during the preparation of the difluorides, and the temperature may be kept at this level by using an ice bath. The following example will serve to illustrate the preparation of a compound having the Formula I wherein ethylenimine is reacted with $P_2O_3F_4$.

This invention relates to novel 1-aziridinyl phosphoryldifluorides, and more particularly it relates to compounds having the following general formula:

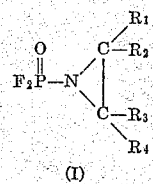

(I)

wherein $R_1$, $R_2$, $R_3$ and $R_4$ are independently selected from the class consisting of a hydrogen atom, an alkyl group, e.g. methyl, ethyl, propyl and butyl, and an aryl group such as phenyl group. These compounds are biologically active and are useful for combating harmful insects.

The compounds having the Formula I are prepared by the reaction of pyrophosphoryltetrafluoride with ethylenimine and its homologs in accordance with the following equation:

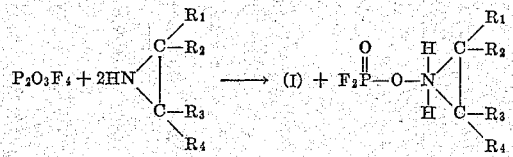

Pyrophosphoryltetrafluoride ($P_2O_3F_4$) is prepared by the reaction of difluorophosphoric acid and phosphoric anhydride as described by E. A. Robinson in the Canadian Journal of Chemistry, 40, 1729 (1962).

*Example 1*

68.0 g. (0.365 mole) of freshly distilled pyrophosphoryltetrafluoride was dissolved in approximately 400 cc. of anhydrous ether. The solution was placed in a one liter three-necked flask equipped with stirrer and dropping funnel, and the flask was packed in ice. Then 31.5 g. (0.733 mole) of ethylenimine in 100 mls. of anhydrous ether was added dropwise to the reaction flask with stirring over a one hour period with the reaction temperature being maintained at 0°–10° C. The reaction mixture was allowed to stand for one hour longer, and then a solid precipitate was removed by filtration. The dried solid had a melting point of 98° C. The following analytical data revealed that 1-aziridinium difluorophosphate had been obtained. Yield: >99.0%.

*Anal.*—Calcd. for $\triangleright NH_2PO_2F_2$: C, 16.5; H, 4.13; N, 9.65; P, 21.4; F, 26.2. Found: C, 17.0; H, 3.93; N, 9.34; P, 20.65; F, 26.6.

The ether filtrate was fractionally distilled, and a colorless material boiling at 44° C./26 mm. was obtained. The following analytical data revealed that 1-aziridinyl phosphoryldifluoride had been obtained in good yield.

*Analysis.*—Calcd. for $\triangleright NPOF_2$: C, 18.9; H, 3.15; N, 11.0; P, 24.4; F, 29.0. Found: C, 19.2; H, 3.12; N, 10.5; P, 24.0; F, 30.1.

Confirmation that the ethylenimine ring remained intact in these compounds was obtained by infrared and nuclear magnetic resonance analyses.

As noted in the preceding discussion, the 1-aziridinyl phosphoryldifluorides of the general Formula I are characterized by unusual biological activity, and they are useful in the area of controlling harmful insects. They are active chemosterilants, and they can be utilized as the chief active ingredient in a variety of pest-sterilant compositions wherein they are admixed with suitable adjuvants. For example, "baits" containing these compounds as the active ingredient, especially with a sugar carrier, have been found to be effective sterilant compositions when administered to houseflies. Subsequent observation of fly eggs collected from oviposition sites revealed a high degree of "non-hatching" or sterile eggs. The compounds (I) also are valuable insecticides. When the aforementioned "bait" was fed to houseflies, a high percentage of fly mortality was obtained even at very low concentrations of active ingredient.

What is claimed is:

1. A process for preparing 1-aziridinyl phosphoryldifluorides which comprises reacting pyrophosphoryltetrafluoride with a compound having the formula

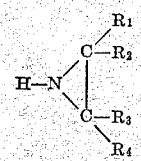

wherein $R_1$, $R_2$, $R_3$ and $R_4$ are selected from the class consisting of hydrogen, alkyl having 1–4 carbon atoms, and phenyl.

2. A process for preparing 1-aziridinyl phosphoryldifluorides which comprises reacting pyrophosphoryltetrafluoride with a compound having the formula

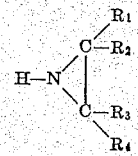

wherein $R_1$, $R_2$, $R_3$ and $R_4$ are selected from the class consisting of hydrogen, alkyl having 1–4 carbon atoms, and phenyl in the presence of an inert organic diluent.

3. A process for preparing 1-aziridinyl phosphoryldifluorides which comprises reacting pyrophosphoryltetrafluoride with a compound having the formula

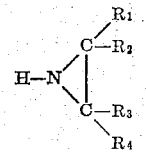

wherein $R_1$, $R_2$, $R_3$ and $R_4$ are selected from the class consisting of hydrogen, alkyl having 1–4 carbon atoms, and phenyl in the presence of an inert organic diluent at a temperature of less than about 10° C., removing the formed 1-aziridinium difluorophosphate from the reaction mixture, and recovering the 1-aziridinyl phosphoryldifluoride.

References Cited by the Examiner
UNITED STATES PATENTS
2,606,902   8/52   Parker et al. _____ 260—239

IRVING MARCUS, *Primary Examiner.*
NICHOLAS S. RIZZO, *Examiner.*

UNITED STATES PATENT OFFICE
CERTIFICATE OF CORRECTION

Patent No. 3,168,514                 February 2, 1965

William C. Preusse

It is hereby certified that error appears in the above numbered patent requiring correction and that the said Letters Patent should read as corrected below.

Column 1, lines 12 and 13, after "2,3-dimethyl-ethylenimine," insert -- 2,3-diphenyl-ethylenimine, --; same column 1, line 10, beginning with "A number of" strike out all to and including "with $P_2O_3F_4$." in line 42, same column 1, and insert the same after "(1962)." in line 2, column 2; column 1, line 57, after "as" insert -- a --.

Signed and sealed this 29th day of June 1965.

(SEAL)
Attest:

ERNEST W. SWIDER                           EDWARD J. BRENNER
Attesting Officer                             Commissioner of Patents